(12) United States Patent
McCaffrey

(10) Patent No.: US 10,024,173 B2
(45) Date of Patent: Jul. 17, 2018

(54) CMC BLADE WITH INTEGRAL 3D WOVEN PLATFORM

(71) Applicant: UNITED TECHNOLOGIES CORPORATION, Hartford, CT (US)

(72) Inventor: Michael G McCaffrey, Windsor, CT (US)

(73) Assignee: United Techologies Corporation, Farmington, CT (US)

( * ) Notice: Subject to any disclaimer, the term of this patent is extended or adjusted under 35 U.S.C. 154(b) by 251 days.

(21) Appl. No.: 14/933,290

(22) Filed: Nov. 5, 2015

(65) Prior Publication Data

US 2016/0053619 A1   Feb. 25, 2016

Related U.S. Application Data

(62) Division of application No. 13/173,308, filed on Jun. 30, 2011, now Pat. No. 9,212,560.

(51) Int. Cl.
*F01D 5/28* (2006.01)
*F01D 5/14* (2006.01)
(Continued)

(52) U.S. Cl.
CPC ............ *F01D 5/282* (2013.01); *C04B 37/003* (2013.01); *F01D 5/147* (2013.01); *F01D 5/284* (2013.01); *B29C 65/006* (2013.01); *B29C 65/48* (2013.01); *B29C 65/565* (2013.01); *B32B 18/00* (2013.01); *C04B 2235/524* (2013.01); *C04B 2235/5224* (2013.01); *C04B 2235/5244* (2013.01); *C04B 2235/5248* (2013.01); *C04B 2237/16* (2013.01); *C04B 2237/341* (2013.01); *C04B 2237/343* (2013.01); *C04B 2237/348* (2013.01);
(Continued)

(58) Field of Classification Search
CPC ... F01D 5/28; F01D 5/82; F01D 5/284; F01D 5/3015; F05D 2300/6033; F05D 2300/603; F05D 2300/6034; F05D 2300/6012; F05D 2250/20
See application file for complete search history.

(56) References Cited

U.S. PATENT DOCUMENTS 5,350,545 A * 9/1994 Streckert ................. C04B 35/80
156/89.27
7,510,379 B2 * 3/2009 Marusko ................. F01D 5/282
29/889.7

(Continued)

FOREIGN PATENT DOCUMENTS

| EP | 2210733 A1 | 7/2010 |
| FR | 2943942 A1 | 10/2010 |
| WO | 2010061140 A1 | 6/2010 |

OTHER PUBLICATIONS

European Office Action dated Oct. 19, 2016 issued in the corresponding EP Patent Appln. No. 12 173 615.1.

*Primary Examiner* — Justin Seabe
*Assistant Examiner* — Behnoush Haghighian
(74) *Attorney, Agent, or Firm* — Bachman & LaPointe, P.C.

(57) ABSTRACT

A method of forming a component for use in a gas turbine engine includes the steps of forming an airfoil/root assembly; creating a platform assembly structure having an opening; inserting the airfoil/root assembly into the opening; and bonding the platform assembly structure to the airfoil/root assembly to form the component.

3 Claims, 3 Drawing Sheets

(51) Int. Cl.
*C04B 37/00* (2006.01)
*B32B 18/00* (2006.01)
*B29C 65/56* (2006.01)
*B29C 65/00* (2006.01)
*B29C 65/48* (2006.01)

(52) U.S. Cl.
CPC .... *C04B 2237/36* (2013.01); *C04B 2237/365* (2013.01); *C04B 2237/366* (2013.01); *C04B 2237/368* (2013.01); *C04B 2237/38* (2013.01); *C04B 2237/61* (2013.01); *C04B 2237/76* (2013.01); *C04B 2237/86* (2013.01); *F01D 5/28* (2013.01); *F05D 2220/32* (2013.01); *F05D 2240/30* (2013.01); *F05D 2300/6012* (2013.01); *F05D 2300/6033* (2013.01); *Y10T 29/49316* (2015.01)

(56) References Cited

U.S. PATENT DOCUMENTS

| | | |
|---|---|---|
| 8,607,454 B2 | 12/2013 | Blanchard et al. |
| 8,734,605 B2 | 5/2014 | Harrison |
| 8,777,583 B2 * | 7/2014 | Darkins, Jr. ............ F01D 5/282 416/191 |
| 8,846,147 B2 * | 9/2014 | Eberling-Fux .......... B29B 11/16 427/249.2 |
| 9,045,992 B2 * | 6/2015 | Roussille ................ B29C 70/24 |
| 9,080,454 B2 * | 7/2015 | Coupe ................... B29C 70/222 |
| 9,162,750 B2 * | 10/2015 | Coupe ................... B64C 11/26 |
| 9,238,595 B2 * | 1/2016 | Bouillon ............... C04B 41/009 |
| 2007/0148000 A1 | 6/2007 | Marusko et al. |
| 2011/0027098 A1 | 2/2011 | Noe et al. |
| 2011/0206522 A1 * | 8/2011 | Alvanos ................. F01D 5/282 416/204 R |

* cited by examiner

CMC BLADE WITH INTEGRAL 3D WOVEN PLATFORM

CROSS REFERENCE TO RELATED APPLICATION(S)

This application is a divisional application of allowed U.S. patent application Ser. No. 13/173,308 filed Jun. 30, 2011 and entitled CMC BLADE WITH INTEGRAL 3D WOVEN PLATFORM.

BACKGROUND

The present invention relates to a component, such as a blade, having an integral platform for use in a gas turbine engine and a method for forming same.

Turbine blades typically require integral platforms, attached to the root region, to form the inner flowpath, and to protect the rim of the disk from hot gas ingestion. The typical cantilevered platform often has to support Blade-to-blade dampers. The combined load of the overhung platform and damper results in large bending stresses at the point where the platform meets the blade root region.

Ceramic Matrix Composites (CMC) are desired for turbine blades due to their high temperature capability. CMC blades made from layers of cloth or unidirectional tape offer good strength in the primary radial load path. Attaching a platform onto a laminated blade is difficult, and made especially challenging due to the low interlaminar strengths of CMC's. The bending of the platform causes high internal interlaminar stresses, and is a limiter on how long the platforms can function.

SUMMARY

In accordance with the instant disclosure, there is provided a method of forming a component for use in a gas turbine engine broadly comprising the steps of: forming an airfoil/root assembly; creating a platform assembly structure having an opening; inserting said airfoil/root assembly into said opening; and bonding said platform assembly structure to said airfoil/root assembly to form said component.

Further, in accordance with the instant disclosure, there is provided a component for use in a gas turbine engine which broadly comprises an airfoil and a root portion formed from a ceramic matrix composite and a three dimensional platform assembly bonded to said airfoil and root portion. The purpose is to create a platform region, with the inherent complexities, which is independent of the airfoil root structure, thus isolating the large radial pull of the airfoil from the platform assembly. Additionally the extension of the platform region into the lower root portion of the blade assembly simplifies the support of the platform by using the airfoil root to clamp the platform assembly to the disk attachment.

Turbine blades experience large radial pull loads due to centripetal acceleration. The simplest blades consist of an airfoil connected directly to a root with no integral platform. This simplifies the design of a ceramic matrix composite blade. In ceramic matrix composite the direction of the fibers control the strength of the ceramic matrix composite. For blades in particular, a strong biasing of the fibers in the radial direction imparts high strength with minimal material. The imposed loads on a blade of this type are dominated by the radial pull and for the airfoil region this creates a large radial tension stress. Bending stress in the airfoil is typically much less. The only region of the blade with large bending stresses is in the root region where it flares outward to form the attachment feature. In this region the ILT (Interlaminar Tensile strength, which is the layer to layer bond tensile strength) of the ceramic matrix composite material is more limiting that the tensile strength. Thus minimizing ILT bending stresses through simplification, and/or reducing the mechanisms that create bending stresses and/or increasing the ILT strength are desired.

Adding a platform to the existing airfoil/root assembly is challenging as the centrifugal loads created by the cantilevered platform, extending outward from the airfoil, create large bending stresses in the base of the platform where it connects with the airfoil. If the ceramic matrix composite platform was integrally woven into the airfoil region, then the fibers at the airfoil to platform intersection would be exposed to both the large radial load of the airfoil and the local bending stresses of the cantilevered platform. Since ITL strength is much lower than the tensile strength, the design would be limited by the local bending stresses in the platform, and not the airfoil region, resulting in lower capability.

Separating the blade into and airfoil/root assembly and a platform assembly allows the ceramic matrix composite structure to be optimized for the loads imposed on those assemblies. For the airfoil/root assembly this means a structure with minimal bending loads and a relatively straight load path between the airfoil and the root region. For the platform assembly a ceramic matrix composite structure with improved ITL capability and the ability to create a platform assembly with complex features is desired. Additionally, if the platform assembly was extended to cover the attachment region of the airfoil/root assembly, the complex bending stresses in the root portion of the airfoil/root assembly could be distributed over a larger region of the root, and lower the magnitude of the ILT stresses in the root, thus increasing the capability of that region.

ILT strength is the strength of the bond between the layers of a ceramic matrix composite. For typical ceramic matrix composites the fiber strength is higher than the matrix strength. Thus for typical assemblies, created by stacking layers, the weaker matrix is the limiting portion, and sets the design limit to the ILT stress of the assembly. In three-dimensional woven forms, additional fibers bridge the layers, such that they increase the ILT capability. A platform assembly made from three-dimensional ceramic matrix composite would have higher ILT capability. Additionally, programmable weaving looms can create complex 3-D woven shapes that can accommodate thickness and dimensional changes through an automated process much faster than by traditional layer by layer assembly techniques. Thus it is desirable to make a ceramic matrix composite platform assembly from a 3-D woven preform for its increased ILT performance with increased complexity.

Bonding an airfoil/root assembly, with optimized ceramic matrix composite construction to a platform assembly with a three-dimensional ceramic matrix composite construction would create a blade assembly with the required complexity of an integral platform and the improved structural performance of due to the combined construction. Additionally the presence of the platform assembly, encasing the airfoil root region, further improves the ILT performance of the airfoil/root assembly by distributing the attachment loads imposed by the turbine disk.

Other details of the ceramic matrix composite blade with integral platform using a complex weave perform are set forth in the following detailed description and the accompanying drawings wherein like reference numerals depict like elements.

DETAILED DESCRIPTION

Figure 1:
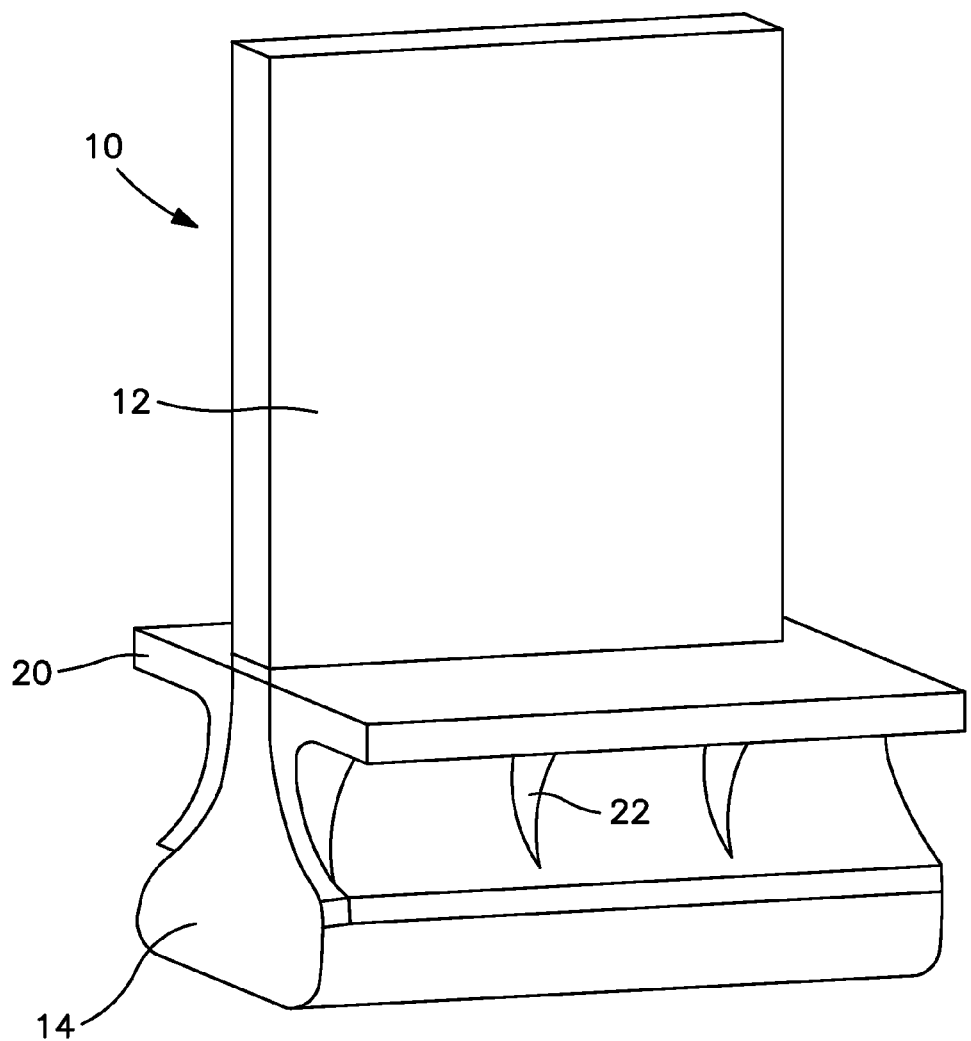
FIG. 1 is a schematic representation of a component which can be used in a gas turbine engine.

Referring now to the drawings, there is shown a ceramic matrix composite blade 10 for use in a gas turbine engine (not shown). The blade 10 may be a turbine blade used in the hot section of the engine.

Figure 2:
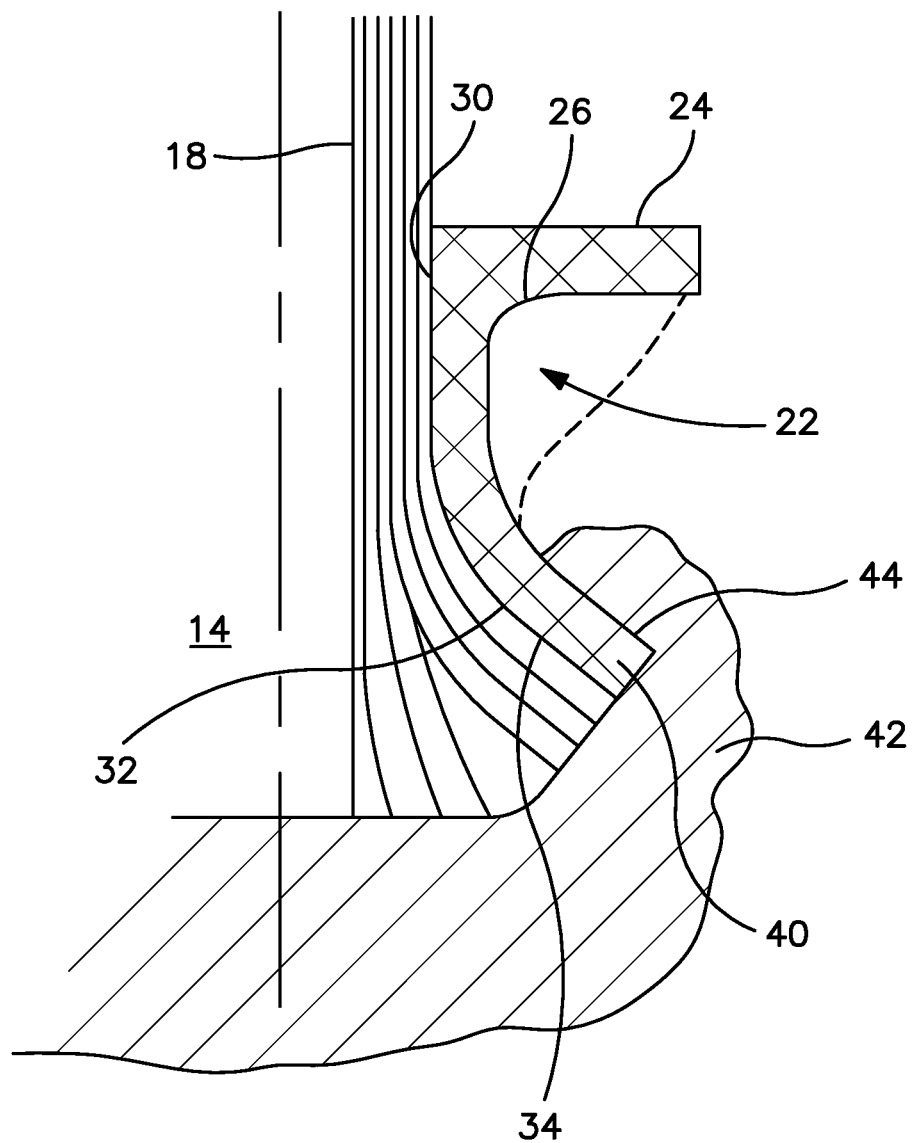
FIG. 2 is a sectional view of the blade of FIG. 1.

The blade 10 has an airfoil portion 12 and a root portion 14. The airfoil portion 12 and the root portion 14 may be an integral structure formed from a plurality of plies 18 of a ceramic matrix composite material as shown in FIG. 2.

As can be seen from FIG. 1, the blade 10 also has a platform 20 and one or more optional buttresses 22 formed from a platform assembly structure 24. The platform assembly structure 24 is formed from a ceramic matrix composite material. The platform assembly 24 process begins with a fibrous pre-form which is in turn infiltrated with ceramic matrix to form a rigid ceramic matrix composite. The fibrous pre-form consists of a combination of three dimensional woven structures and/or portions made from chopped fibers and/or two dimensional woven cloth 26. Two dimensional woven cloth typically has fiber/tow bundles interwoven such that a large flat sheet is created with a thickness of the sheet being approximately twice the thickness of the fiber/tow bundles. Three-dimensional woven preforms consists of fiber/tow bundles that are woven in such a manner as to have additional fiber/tow bundles such that the thickness can be increased, and complex shapes created where local thick sections can be added and still retain connectivity to the thin sections with continuous fiber/tow connectivity. As will be discussed hereinafter, the platform assembly structure 24 is bonded to the airfoil portion 12 and root assembly 14 so as to form an integral structure.

Figure 3:
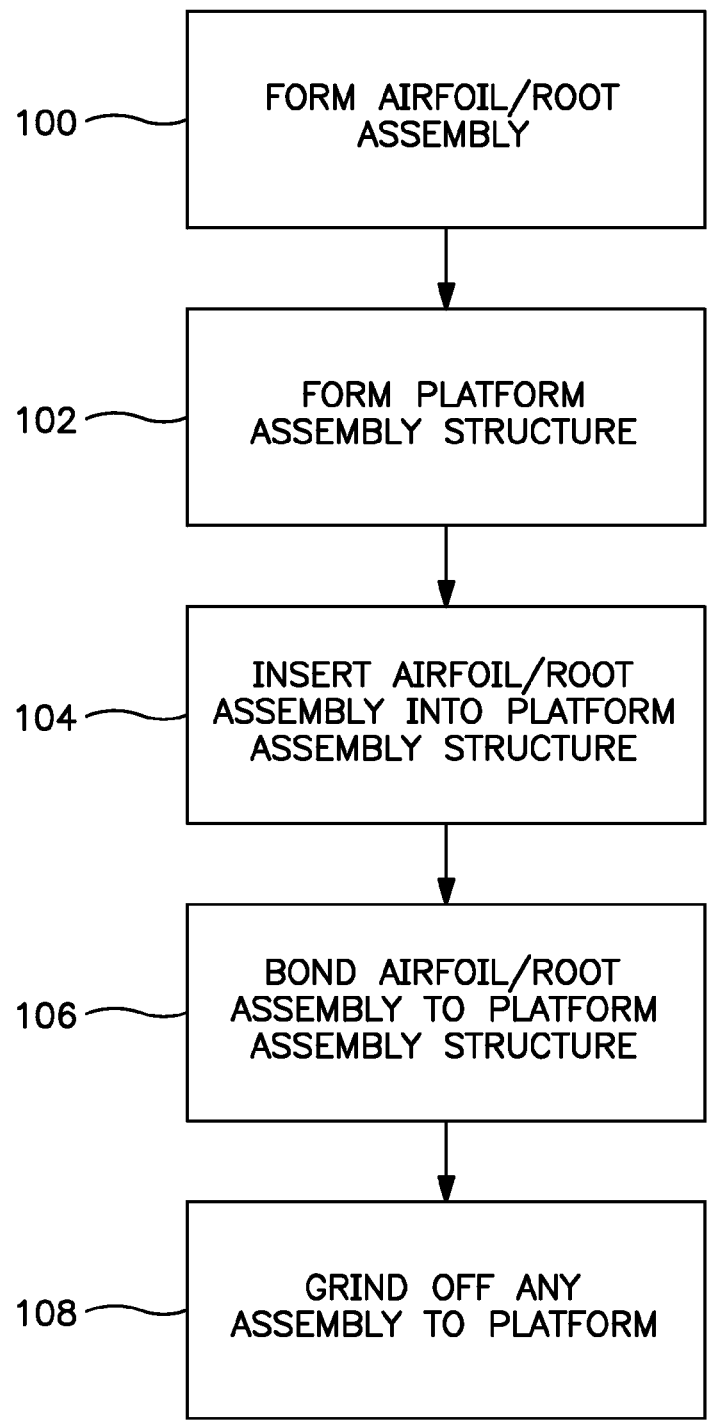
FIG. 3 is a flow chart showing the assembly method for forming the blade of FIG. 1.

Referring now to FIG. 3, the method of forming the blade 10 includes the step 100 of forming the airfoil/root assembly by laying up plies 18 of a ceramic matrix composite material in a mold and infiltrating the plies with a matrix material. The plies 18 may be formed from a uni-directional tape and/or a fabric or woven material such that a strong primary structure is created that can transmit the radial pull of the blade airfoil 12 into the root attachment region 14. A fabric may be made from fibers called tows. Individual tows are woven together to create the fabric. Unidirectional-Tape can be made from a collection of individual fibers or a collection of tows, bonded together to form a continuous sheet of uniform thickness. The Unidirectional tape can be cut, like fabric and stacked together with plies. After the plies 18 have been laid up, they may be joined together to form the airfoil/root assembly using low temperature polymerization, high temperature polymerization and/or pyrolysis techniques, or bonding with a Silicon interfacial layer.

As shown in step 102, the platform assembly structure 24 is formed separately from the airfoil/root assembly. The platform assembly structure 24 may be formed from a ceramic matrix composite. For example, the structure 24 may be formed using a plurality of three dimensional or chopped fibers which have been infiltrated by a matrix material. Here again, bonding may be accomplished using low temperature polymerization, high temperature polymerization, and/or pyrolysis, or bonding with a Silicon interfacial layer. The structure 24 may be formed in a mold. Further, the structure 24 is formed to have a central opening 30 which extends from the top to the bottom of the structure 24. In other words, the structure 24 has a hollow core. The structure 24 may be fabricated with one or more chord-wise spaced apart buttresses 22. If desired, the buttresses 22 may be omitted.

The fibers used to form the platform assembly structure 24 may include fibers such as silicon carbide, aluminum oxide, silicone nitride, carbon, and combinations thereof.

The matrix used to form the platform assembly structure and/or the airfoil/root assembly may include magnesium aluminum silicate, magnesium barium aluminum silicate, lithium aluminum silicate, barium strontium aluminum silicate, bariums aluminum silicate, silicon carbide, silicon nitride, aluminum oxide, silicon aluminum oxynitride, aluminum nitride, zirconium oxide, zirconium nitride, and/or hafnium oxide.

In step 104, the airfoil/root assembly is inserted into the opening 30 in the structure 24 so that the outer edge 32 of the root portion is abutted by an inner edge 34 of the structure 24.

In step 106, the platform assembly structure 24 is bonded to the airfoil/root assembly to form the blade 10. The bonding step may be carried out by introducing the matrix material and heating to densify the ceramic matrix composite material and bond the airfoil/root assembly to the platform assembly. The platform assembly 24 may be formed so that a portion of the platform assembly 24 may extend radially inward and cover a root region of the airfoil root assembly. Alternatively the bonding step may be carried out by introducing a bonding agent such as silicon, which after bonding creates a interfacial layer between the airfoil/root assembly and the platform assembly. Silicon, deposited in a layer on the blade/attachment assembly and/or the platform assembly, would then disperse into the resulting assembly when heated and constrained appropriately, forming a continuous bond between the airfoil/attachment assembly and the platform assembly.

In step 108, any protruding portion, such as fibers, may be ground off.

As shown in FIG. 2, the platform root section 40 is integrated onto the blade root section 14 such that the contact between the final blade 10 and a disk 42 occurs on the exterior surface 44 created by the three dimensional woven platform root section.

While the present disclosure has been described in the context of forming a turbine blade, the method could also apply to the manufacture of other components for use in a gas turbine engine.

There has been described herein a ceramic matrix composite blade with integral platform using complex weave perform. While the ceramic matrix composite blade has been described in the context of specific embodiments thereof, other unforeseen alternatives, modifications, and variations may become apparent to those skilled in the art having read the foregoing description. Accordingly, it is intended to embrace those alternatives, modifications and variations which fall within the broad scope of the appended claims.

What is claimed is:

1. A component for use in a gas turbine engine comprising an airfoil and a root portion formed from a ceramic matrix composite and a platform assembly comprising a ceramic matrix composite three dimensional woven material bonded to said airfoil and root portion; wherein said airfoil and root portion is formed from a plurality of layers of a uni-directional tape material; wherein said platform assembly includes integral chord-wise buttress structures located spaced apart in the chord-wise direction along the length of said platform assembly structure; and an interfacial layer between the airfoil/root portion and the platform assembly structure.

2. The component of claim 1, wherein said platform assembly overlays the root portion so that contact between the blade and a disk occurs on an exterior surface of the platform assembly.

3. The component of claim 1, wherein said component is turbine blade.

* * * * *